Sept. 23, 1958 G. L. ATHERHOLT, SR 2,853,306
EXPANSIBLE RING CHUCK
Filed Aug. 15, 1957 2 Sheets-Sheet 1

INVENTOR.
GEORGE L. ATHERHOLT SR.
BY
BARNES, KISSELLE, RAISCH AND CHOATE
ATTORNEYS

Sept. 23, 1958 G. L. ATHERHOLT, SR 2,853,306
EXPANSIBLE RING CHUCK
Filed Aug. 15, 1957 2 Sheets-Sheet 2

INVENTOR.
GEORGE L. ATHERHOLT SR.
BY
BARNES, KISSELLE, RAISCH AND CHOATE
ATTORNEYS

# United States Patent Office 2,853,306
Patented Sept. 23, 1958

2,853,306

EXPANSIBLE RING CHUCK

George L. Atherholt, Sr., Van Dyke, Mich.

Application August 15, 1957, Serial No. 678,322

10 Claims. (Cl. 279—4)

This invention relates to work holding chucks and more particularly to a chuck for holding slender parts such as gear blanks in an accurately centered location with respect to the axis of rotation of the chuck.

It is an object of the present invention to provide an improved work holding chuck of the character described in which a part may be gripped at its external periphery by a plurality of gripping members which are moved radially by means of hydraulic expansion of a slender ring.

In the manufacture of expansible arbors, it is known to provide a slender sleeve mounted upon a core together with suitable sealing means and to arrange for the application of hydraulic pressure directly to the interior of the sleeve for the purpose of expanding the same into contact with the bore of a work piece. Arbors of this type are well suited for accurate location of work pieces from the bore therein, but have not heretofore been usuable for holding the external surface of a work piece.

It is an object of the present invention to provide a work holding chuck which can grip the exterior surface of a work piece and which is operated by the expansion and contraction of a hydraulically operated thin sleeve.

Figure 1:
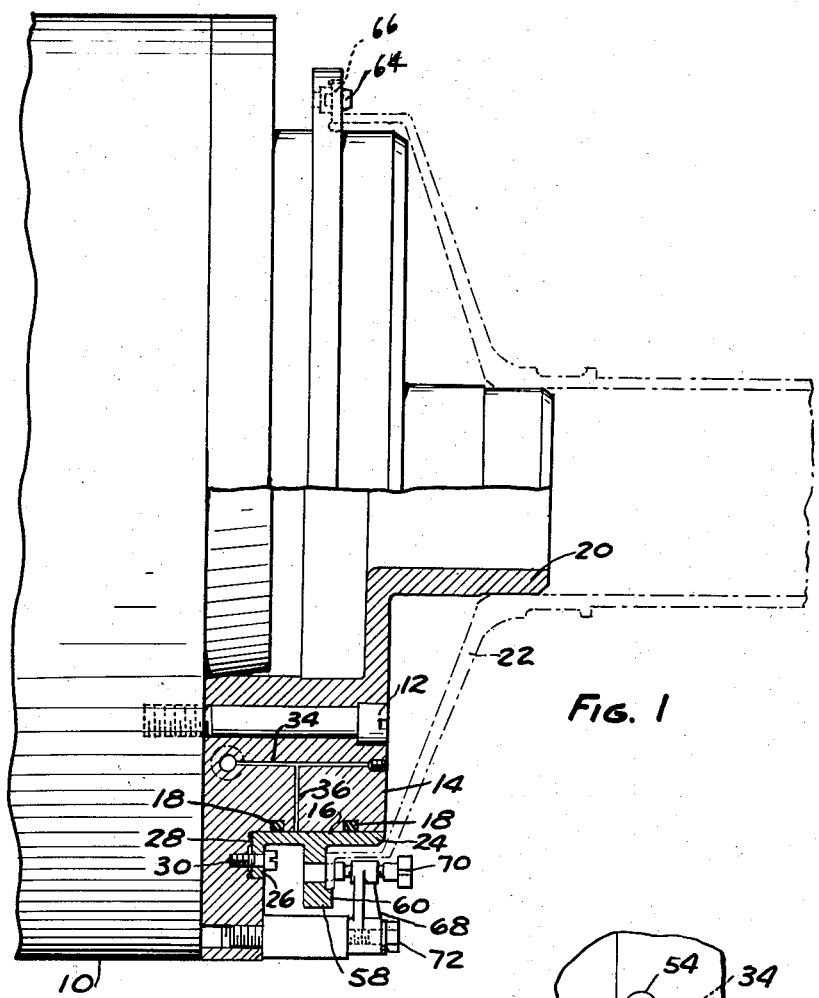
Fig. 1 is a longitudinal view partly in section of a preferred form of the present invention.
Figure 2:
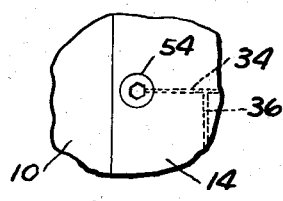
Fig. 2 is a fragmentary end view of an operating mechanism for the chuck.

Referring now to the drawings, there is shown a work spindle 10 which may, for example, be a spindle of a lathe or grinder and which has attached thereto by screws 12 a main chuck body or core member 14. The member 14 is provided with an external cylinder surface 16 within which are formed a pair of sealing ring grooves 18 carrying a suitable seal such as the O-ring type. The core member 14 may be provided with a cylindrical hub extension 20 for the purpose of giving additional or pilot support to a work piece of the type indicated in dotted lines at 22.

Secured to the core 14 in close contact with the cylindrical surface 16 is an expansible ring 24. The ring 24 has a mounting flange 26 secured in a grove 28 by screws 30. There is thus provided a film-like space for hydraulic pressure between the surface 16 and the interior of the ring 24 in an axial zone bounded by the two sealing grooves 18.

Figure 4:
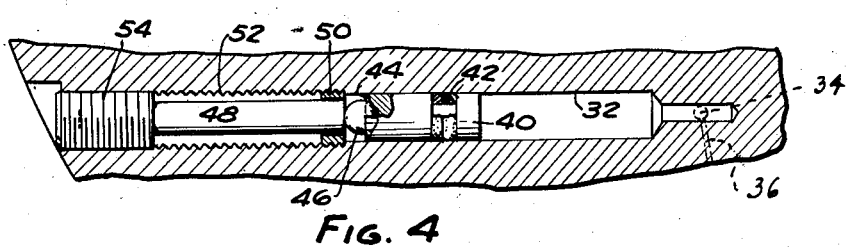
Fig. 4 is a fragmentary sectional view of the operating mechanism.

For the purpose of expanding and contracting the ring 24, there is provided one or more hydraulic cylinders 32 (Fig. 4) which communicates through passages 34 and 36 with the expansion space inside ring 24. An auxiliary passage 38 may be provided for air bleeding and to communicate with a second hydraulic cylinder, not shown, located in the upper part of the core 14 which may be identical with the cylinder 32, and have similar operating parts to those about to be described.

Positioned within the cylinder 32 is a piston 40 having an O-ring seal 42 and a pointed socket 44 at its left hand end. A ball 46 rests in the socket 44 and forms an abutment for an operating plunger 48. A collar 50 is threaded in a bore 52 to form a limiting stop to prevent displacement of the piston 40 out of the cylinder 32. The plunger 48 is operated by a socket head screw 54 also threaded in the bore 52. A wrench 56 may be utilized for turning the screw 54.

For the purpose of holding the part 22 on its outer periphery, the ring 24 is provided with an integral, interrupted, outwardly extending flange 58 having an inwardly facing shoulder 60. The flange 58 is interrupted by radial openings 62 at spaced points around its periphery so that in effect a number of segmental jaws are formed, each of which is integrally attached to the ring 24. If desired, a diamond shaped locating pin 64 may be mounted in the flange 58 adjacent the shoulder 60 and retained by a screw 66 for the purpose of engaging between gear teeth previously formed on the work piece 22.

In order to initially clamp the work piece against the front face of the flange 58, a pivoted lever 68 is mounted on the periphery of the core 14 and carries a clamp screw 70. The lever 68 may be oscillated about its mounting pivot 72. If desired, a number of similar clamps may be located at spaced joints around the periphery of the work piece.

In operation, the cylinder 32, passages 34 and 36 and 38 are filled with a suitable hydraulic fluid such as heavy oil or grease. This may be accomplished either by removing the piston 40 or by removing one or more of the plugs at the ends of the conduits 38. The piston 40 is replaced and the operating screw 54 turned until a substantial pressure is built up, causing the ring 24 to be expanded radially outwardly.

Figure 3:
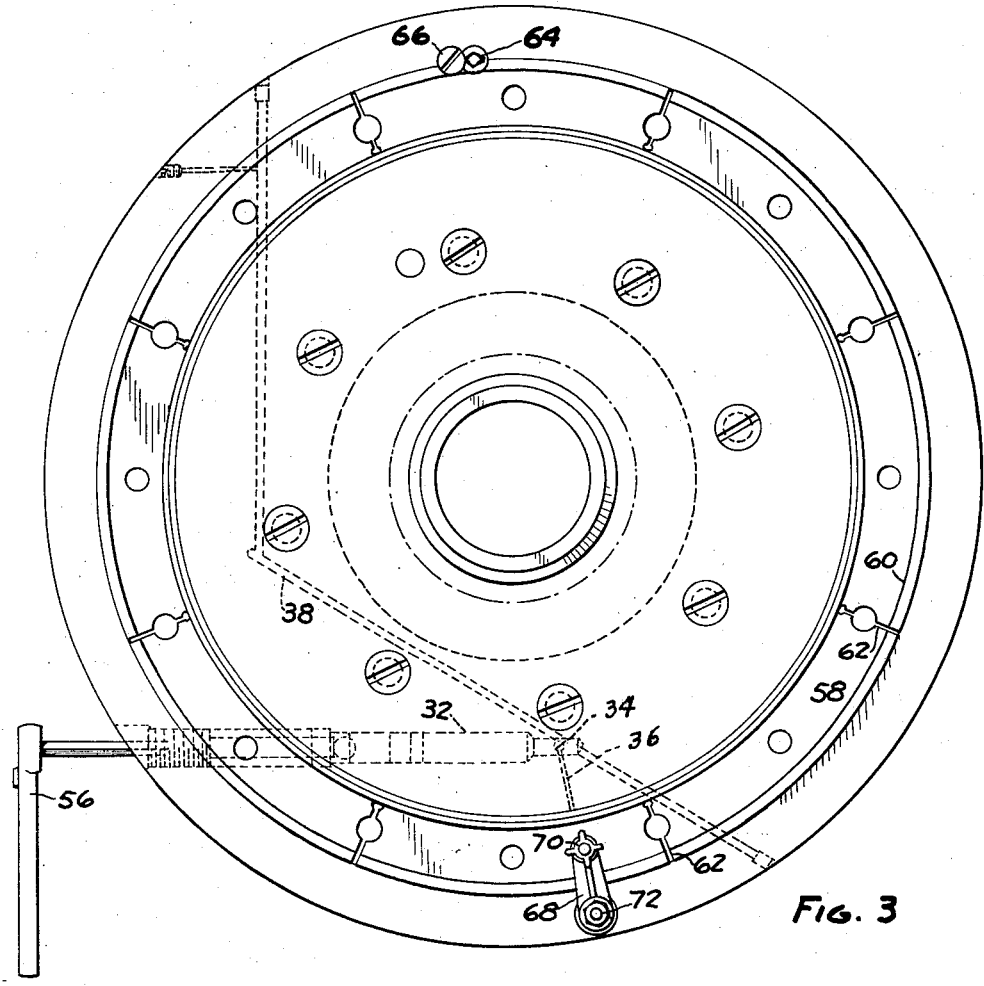
Fig. 3 is an end view of the chuck.

With the clamp lever 68 swung to a horizontal position in Fig. 3, the work piece 22 may be slipped over the pilot or hub 20 so that its end face engages with the flange 58 and its teeth are indexed by the diamond pin 64. The clamp lever 68 is then moved to the position shown in Fig. 3 and the screw 70 turned to clamp the work piece. The operating screw 54 is then backed off a small amount sufficient to permit the ring 24 to contract and bring the shoulder 60 into clamping engagement with the periphery of the work piece 22. This holds the work piece securely and evenly around its periphery and serves to accurately center the same.

It will be seen that the shoulder 60 may be readily formed in an accurate manner by finishing the same while it is in location upon the chuck and, preferably, upon the spindle with which it is to be used. As each of the segments which are formed from the flange 58 moves radially inward the pressure is applied to the work piece 22 uniformly at all points around its periphery. Thus, distortion of a slender part such as illustrated at 22 is avoided while at the same time an accurate and unyielding clamping grip is established.

What is claimed is as follows:

1. A work holding chuck comprising a core member having an external cylindrical surface, a ring member having an internal cylindrical surface sealed to the surface of the core at axially spaced zones to define a sealed space, said ring having an expansible wall section intermediate the zones and a plurality of gripping members attached thereto and extending radially outward, each gripping member having an inwardly facing shoulder portion forming a work engaging surface, and means for injecting and withdrawing fluid into and from the sealed space between the core and ring.

2. A work holding chuck comprising a core member having an external cylindrical surface, a ring member having an internal cylindrical surface sealed to the surface of the core at axially spaced zones to define a sealed space, said ring having an expansible wall section intermediate the zones and a plurality of gripping members attached thereto and extending radially outward, each gripping member constituting a sector of a flange integral with the ring and having an inwardly facing shoulder portion forming a work engaging surface, and means for injecting and withdrawing fluid into and from the sealed space between the core and ring.

3. A work holding chuck comprising a core member having an external cylindrical surface, a ring member having an internal cylindrical surface sealed to the surface of the core at axially spaced zones to define a sealed space, said ring having an expansible wall section intermediate the zones and a plurality of gripping members attached thereto and extending radially outward, each gripping member having an inwardly facing shoulder portion forming a work engaging surface, and means including a hydraulic cylinder and a piston slidable therein for injecting and withdrawing fluid into and from the sealed space between the core and ring.

4. A work holding chuck comprising a core member having an external cylindrical surface, a ring member having an internal cylindrical surface sealed to the surface of the core at axially spaced zones to define a sealed space, said ring having an expansible wall section, intermediate the zones and a plurality of gripping members attached thereto and extending radially outward, each gripping member constituting a sector of a flange integral with the ring and having an inwardly facing shoulder portion forming a work engaging surface, and means including a hydraulic cylinder and a piston slidable therein for injecting and withdrawing fluid into and from the sealed space between the core and ring.

5. A work holding chuck comprising a core member having an external cylindrical surface, a ring member having an internal cylindrical surface sealed to the surface of the core at axially spaced zones to define a sealed space, said ring having an expansible wall section intermediate the zones and a plurality of gripping members attached thereto and extending radially outward, each gripping member having an inwardly facing shoulder portion forming a work engaging surface, means including a hydraulic cylinder and a piston slidable therein for injecting and withdrawing fluid into and from the sealed space between the core and ring, and a threaded operating member for advancing the piston.

6. A work holding chuck comprising a core member having an external cylindrical surface, a ring member having an internal cylindrical surface sealed to the surface of the core at axially spaced zones to define a sealed space, said ring having an expansible wall section intermediate the zones and means forming an outwardly extending, circumferentially interrupted flange having an inwardly facing shoulder and means for expanding and contracting the ring and flange to cause respective release and gripping of a work piece.

7. A work holding chuck comprising a core member having an external cylindrical surface, a ring member having an internal cylindrical surface sealed to the surface of the core at axially spaced zones to define a sealed space, said ring having an expansible wall section intermediate the zones, means forming an outwardly extending, circumferentially interrupted flange having an inwardly facing shoulder and hydraulic means for expanding and contracting the ring and flange to cause respective release and gripping of a work piece.

8. A work holding chuck comprising a core member having an external cylindrical surface, a ring member having an internal cylindrical surface sealed to the surface of the core at axially spaced zones to define a sealed space, said ring having an expansible wall section intermediate the zones, means forming an outwardly extending, circumferentially interrupted flange having an inwardly facing shoulder, hydraulic means for expanding and contracting the ring and flange to cause respective release and gripping of a work piece, and means for axially clamping a work piece in engagement with the flange.

9. A work holding chuck comprising, a core member having a surface and means secured over said surface cooperating therewith to define a sealed space, means operable selectively to introduce fluid under pressure into said space, the first said means being resiliently distortable outwardly from said surface responsive to introduction of fluid under pressure into said space, means forming an inwardly disposed workpiece engaging shoulder carried by the first said means, the first said means returning resiliently toward said surface upon relief of fluid pressure in said space whereby to engage said shoulder against a workpiece.

10. A work holding chuck comprising, a core member and another member cooperating to define a sealed space, means operable selectively to introduce fluid under pressure into said space, said other member being resiliently distortable away from said core member responsive to introduction of fluid under pressure into said space, means forming a workpiece engaging element carried by said other member and disposed generally toward said core member, said other member returning resiliently toward said core member upon relief of fluid pressure in said space whereby to engage said element against a workpiece.

References Cited in the file of this patent

UNITED STATES PATENTS

| | | |
|---|---|---|
| 1,815,562 | Godfriaux | July 21, 1931 |
| 2,671,666 | Hall | Mar. 9, 1954 |
| 2,807,180 | Adams | Sept. 24, 1957 |